(12) United States Patent
Hüger et al.

(10) Patent No.: US 12,148,225 B2
(45) Date of Patent: Nov. 19, 2024

(54) METHOD FOR PARKING A VEHICLE IN A PERPENDICULAR PARKING SPACE TAKING INTO ACCOUNT HEADLIGHT POSITIONS OF ADJACENTLY PARKED VEHICLES, AND PARKING ASSISTANCE SYSTEM

(71) Applicant: Volkswagen Aktiengesellschaft, Wolfsburg (DE)

(72) Inventors: Philipp Hüger, Rühen (DE); Christian Jördens, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 473 days.

(21) Appl. No.: 17/610,555

(22) PCT Filed: Apr. 28, 2020

(86) PCT No.: PCT/EP2020/061800
§ 371 (c)(1),
(2) Date: Nov. 11, 2021

(87) PCT Pub. No.: WO2020/229169
PCT Pub. Date: Nov. 19, 2020

(65) Prior Publication Data
US 2022/0230451 A1   Jul. 21, 2022

(30) Foreign Application Priority Data
May 16, 2019   (DE) ..................... 10 2019 207 190.2

(51) Int. Cl.
*G06K 9/00*   (2022.01)
*G06T 7/70*   (2017.01)
(Continued)

(52) U.S. Cl.
CPC .............. *G06V 20/584* (2022.01); *G06T 7/70* (2017.01); *G06T 7/90* (2017.01); *B60W 30/06* (2013.01);
(Continued)

(58) Field of Classification Search
CPC .... G06T 7/62; G06T 7/70; G06T 7/90; G06T 2207/10024; G06T 2207/30264;
(Continued)

(56) References Cited

U.S. PATENT DOCUMENTS

2010/0066825 A1   3/2010   Kuboyama et al. .......... 348/118
2017/0043766 A1   2/2017   Ha et al. ......................... 701/23
(Continued)

FOREIGN PATENT DOCUMENTS

| CN | 101631695 A | 1/2010 | ............ B60R 21/00 |
| CN | 106572330 A | 4/2017 | ........... H04B 10/116 |

(Continued)

OTHER PUBLICATIONS

German Office Action, Application No. 102019207190.2, 4 pages, Feb. 14, 2020.
International Search Report and Written Opinion, Application No. PCT/EP2020/061800, 6 pages, Jul. 9, 2020.
Chinese Office Action, Application No. 2020800364088, 14 pages, Jun. 26, 2024.

*Primary Examiner* — Duy M Dang
(74) *Attorney, Agent, or Firm* — Slayden Grubert Beard PLLC (57) ABSTRACT

The disclosure relates to a method for parking a vehicle in a first perpendicular parking space, wherein the position and/or the orientation of another vehicle is determined in the second perpendicular parking space and, depending thereupon, the target position and/or the target orientation of the vehicle in the first perpendicular parking space is determined, wherein by means of at least one optical detection unit of the vehicle, at least one image of the at least one other vehicle is generated before parking the vehicle in the first (Continued)

perpendicular parking space, and the image is evaluated as to whether a headlight or a taillight of the other vehicle is recognized in the image, and depending thereupon, the orientation of the other vehicle is determined.

20 Claims, 4 Drawing Sheets

(51) Int. Cl.
    *G06T 7/90*     (2017.01)
    *G06V 20/58*     (2022.01)
    *B60W 30/06*     (2006.01)

(52) U.S. Cl.
    CPC .............. *G06T 2207/10024* (2013.01); *G06T 2207/30264* (2013.01)

(58) Field of Classification Search
    CPC ....... G06T 2207/30; G06T 2207/30248; G06T 2207/30252; G06T 2207/30268; G06V 20/50; G06V 20/56; G06V 20/58; G06V 20/584; G06V 20/586; B60R 21/00; B60W 30/06; G08G 1/143; B62D 15/0285; B62D 15/02; B62D 15/027; B62D 15/029
See application file for complete search history.

(56) References Cited

U.S. PATENT DOCUMENTS

| | | |
|---|---|---|
| 2017/0371340 A1 | 12/2017 | Cohen et al. |
| 2018/0322349 A1 | 11/2018 | Hayakawa |

FOREIGN PATENT DOCUMENTS

| | | | |
|---|---|---|---|
| CN | 109416257 A | 3/2019 | ............ B60W 30/09 |
| CN | 109677398 A | 4/2019 | |
| DE | 102006004770 A1 | 5/2007 | |
| DE | 102010033212 A1 | 2/2012 | |
| DE | 102011077173 A1 | 12/2012 | |
| DE | 102012201495 A1 | 8/2013 | |
| DE | 102014210043 A1 | 10/2015 | |
| DE | 102018204994 A1 | 10/2019 | |
| DE | 102019207190 B3 | 8/2020 | |
| EP | 1634243 B1 | 2/2012 | |
| EP | 2597016 A1 | 5/2013 | |
| EP | 2597016 B1 * | 8/2014 | ............ B62D 15/02 |
| GB | 2491720 A | 12/2012 | |
| GB | 2496905 A | 5/2013 | |
| WO | 2018/177702 A1 | 10/2018 | |
| WO | 2020/229169 A1 | 11/2020 | |

\* cited by examiner

METHOD FOR PARKING A VEHICLE IN A PERPENDICULAR PARKING SPACE TAKING INTO ACCOUNT HEADLIGHT POSITIONS OF ADJACENTLY PARKED VEHICLES, AND PARKING ASSISTANCE SYSTEM

CROSS-REFERENCE TO RELATED APPLICATIONS

This application claims priority to German Patent Application No. DE 10 2019 207 190.2, filed on May 16, 2019 with the German Patent and Trademark Office. The contents of the aforesaid patent application are incorporated herein for all purposes.

TECHNICAL FIELD

This disclosure relates to a method for parking a vehicle in a first perpendicular parking space.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

DE 10 2011 077 173 A1 describes a method for determining a parking trajectory. To determine the orientation of the adjacently parked vehicles, a steering wheel of the other parked vehicles can be determined relative to its position and, depending thereupon, it can be recognized whether the adjacently parked vehicle is parked facing forward or backward.

This prior art indicates the basis on which information is to determine the orientation of the adjacently parked vehicles. However, these components as given by a steering wheel are relatively hidden and therefore only detectable with difficulty. Moreover, they are arranged in the interior of the motor vehicle, and they may therefore be difficult to determine from the outside solely for this reason. The orientation of the vehicles parked in the adjacent perpendicular parking spaces is therefore insufficiently possible in the prior art.

SUMMARY

A need exists to provide a method and a park assistance system in which adjacent vehicles may be better detected in a parking process to be executed by a vehicle in a perpendicular parking space.

The object is solved by a method and a park assistance system according to the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for parking a vehicle in a first perpendicular parking space. Another vehicle is parked in at least one second perpendicular parking space that directly borders the first perpendicular parking space. The position and/or orientation of the other vehicle in the second parking space is determined. Depending thereupon, the target position to be achieved is determined and/or the target orientation of the vehicle to be achieved in the first perpendicular parking space in which the vehicle is to be parked, in particular before parking in the first perpendicular parking space. By means of an optical detection unit of the vehicle, at least one image of the additional vehicle is generated before parking the vehicle in the first perpendicular parking space. The image is evaluated as to whether a headlight or a taillight of the other vehicle is recognized in the image. It is recognized that the other vehicle is parked oriented forward in the second perpendicular parking space when at least one taillight of the other vehicle is included in the image. It is recognized that the other vehicle is parked oriented backward in the second perpendicular parking space when at least one headlight of the other vehicle is included in the image. Forward parking in this context is such an orientation in which the front of the other vehicle faces the rear boundary of the perpendicular parking space, and the rear of this other vehicle faces the lane that borders this second perpendicular parking space.

Such a setup makes it possible to detect the other vehicle faster and more precisely with respect to its orientation in the second perpendicular parking space. In this context, characteristic components of this other vehicle are evaluated. These characteristic components are those that are arranged externally on the other vehicle. These components may therefore be recognized more easily and clearly. This allows an improved and more precise determination of the orientation of the other vehicle in the second perpendicular parking space to be achieved. Moreover, particularly these specific light sources, i.e., a taillight and a headlight, are more distinct characteristic features that allow an orientation of the other vehicle. Since for example a steering wheel as evaluated in the prior art may also be extensively covered by a dashboard or the like, recognition is difficult in this respect. Moreover, a steering wheel may also be at several positions, for example in a left-hand driving vehicle or right-hand drive vehicle. It is therefore impossible in the prior art to clearly determine the orientation of the vehicle using the steering wheel.

Contrastingly with the procedure of the present exemplary aspect, it is clear that the vehicle is parked facing forward in the second perpendicular parking space when a taillight is recognized. Since taillights may only be arranged on the rear of a vehicle, these specific light sources are also an orientation for uniquely indicative components. The same holds true in the context for headlights. Moreover, such specific light sources as have been mentioned enable an improved recognition of the orientation even under a wide variety of perspectives from which the other vehicle may be detected by the optical detection unit. In particular, it is moreover also possible to be able to determine the orientation more easily and quickly as well as precisely since two taillights and two headlights are usually installed in a vehicle. Even under widely varying perspectives, at least one taillight or at least one headlight may be recognized, and an orientation may therefore be determined more precisely by using one of these particular light sources.

In some embodiments, it may be provided that a coloring of a light source in the image is analyzed. A taillight is recognized when a red light source is recognized. In particular, it is thereby also clearly recognized that a headlight is not present since such may never be red. In particular when a "white" light source is recognized, a headlight of the vehicle may be present. It may however also be a taillight. In specific vehicles, taillights may also be designed to at least predominantly appear white. In particular, a headlight of the other vehicle is recognized when a white light source is recognized. Since, when the light source is not in a switched on state, these colorings are typical for these two specific light sources in the vehicle, in particular due to the permanently "colored" lenses, the orientation of the other vehicle may be determined relatively clearly by using a simple criterion, i.e., this coloring. Moreover, these colorings are also so different, i.e., white or essentially white and red or essentially red, that a taillight and a headlight may also be clearly differentiated.

In some embodiments, it may be provided that the image is evaluated as to whether an equivalent light source is recognized in the direction of the width of the other vehicle at opposing end regions, or respectively side regions of this other vehicle. Light sources in the region of the other vehicle are then thereby recognized that may be headlights or taillights. Since these specific light sources, i.e., a taillight and a headlight, are also normally arranged at very specific zones of a vehicle, an improved and more precise assignment of these components as a headlight or a taillight may also occur through this local identification of light sources in the image in the other vehicle. This in turn yields the more precise determination of the orientation of this other vehicle.

In particular when color profiles in the image are evaluated, in particular a taillight and/or a headlight may be inferred when the color profiles are shown to be the same, or substantially the same, size and/or coloring in the image. Since a vehicle at the opposite end regions in the direction of the width regions has the same taillights and the same headlights, such light sources may also be more precisely inferred by correspondingly spaced, equivalent color profiles in the image.

In some embodiments. It may be provided that an official identification which is a license plate of the other vehicle is searched for in the image. When such an official identification is recognized, a headlight or a taillight of the other vehicle is searched for in the image depending thereupon. This is another beneficial procedure. An official identification is a particularly characteristic feature of a vehicle and may clearly differ from other components. It may therefore be easily and quickly recognized. Since normally such official identifications are attached at a few very specific locations of a vehicle, a reference point, or respectively a reference position may also be effectively formed by the detection of an official identification. Since it is also known in the context that these specific light sources, i.e., taillights or headlights, are effectively duplicated and are normally formed, in particular symmetrically, on opposite sides in the direction of the width of the other vehicle of such an official identification, such a locating of an official identification also makes it possible to locate taillights and/or headlights in the image more quickly and more precisely.

In some embodiments, it may be provided that, when the official identification is recognized in the image based on the position of the official identification, two new search fields for further evaluation, or respectively analysis in the image are generated. These search fields are formed at a specific first distance from the position of the official identification in the direction of width of the other vehicle. This is another beneficial embodiment since, even when an official identification has been found, potential light sources do not have to be searched for in the form of headlights or taillights in all of the remaining area of the image. In this context, a local excerpt in the image is used that is formed by such a search field. Then a headlight or a taillight is searched for only in this search field that is arranged or respectively generated in a locally defined manner. This reduces the effort for the search for such a specific headlight or a specific taillight.

In addition or instead, it may be provided that, when the official identification is recognized in the image based on the position of the official identification, two new search fields in the image are generated that, in the direction of the height of the other vehicle, each have a specific second distance to the position of the official identification. The benefits already indicated above also apply in this respect.

In particular, these two distances, i.e., the first distance and the second distance, are formed where light sources of the other vehicle are normally arranged relative to the official identification on a vehicle. Therefore, not only is a smaller search zone formed from the entire image, i.e., by the search fields, they are also beneficial specifically set locally in the image such that, when there is a headlight or a taillight, they therefore must also be in this locally set search field with a high probability. This also reduces the effort for the search for such a headlight or a taillight. The entire method may therefore be carried out faster.

In some embodiments, it may be provided that a color distribution is evaluated in these search fields. When there is a red component greater than a threshold, a taillight is recognized. In particular when there is a white component greater than a threshold, a headlight is recognized. If the white component is less than a threshold, a taillight may also be present. This makes it easier to search for a taillight or a headlight. In this context, it may be relatively simple and easy when the search fields are limited in area and are set to be locally defined in the image relative to the official identification so that it is possible to locate a headlight or a taillight with great probability. Since a precise color distribution, in particular in the red component and the white component, is also searched for in a very simple and effortless manner, a taillight or a headline may be very quickly and easily inferred in the particular search field, in particular without an additional specific search analysis. This coloring is an easy to evaluate analytical parameter.

In some embodiments, it may also be provided that the search fields are set to be large enough for a characteristic boundary contour of a component of the other vehicle that is normally arranged in a rear or a front of the other vehicle is detected, or respectively may be detected, wherein the rear or the front is detected in the image. The boundary contour is evaluated as to whether the component in the image is an external light source, in particular as to whether it is a headlight or a taillight. By such a procedure, an alternative way may be created to be able to recognize a headlight or a taillight more precisely in addition to or instead of evaluating the color distribution. These boundary contours of the specific light source may also be precise analytical parameters to make it possible to better recognize such specific light sources.

In some embodiments, it may be provided that, depending on the position of the official identification, at least a third search field is generated in the image. This third search field is separate and independent of the other two search fields. It may be provided that this third search field is generated in particular directly above the official identification. It may however also be generated on the vehicle at another location in the image. The third search field is evaluated with respect to its coloring, and depending thereupon, the coloring of the other vehicle is determined. This is another beneficial design. It makes it possible to recognize the basic coloring of the vehicle and thereby the paint of the vehicle. This also allows misinterpretations to be avoided in the other search fields. In particular when similar colorings such as a red tone or a white tone similar to the light source relates to the paint of the vehicle, this may also enable a distinction between a headlight and a taillight. In particular, this is however also another additional unique characteristic when the vehicle has another coloring such as red or white in order to also be able to then clearly distinguish a headlight or taillight therefrom. Particularly this local position of the third search field is of benefit in order to be able to very precisely recognize such paint of the vehicle. Normally when a larger zone such as for example the hood or a luggage compartment is arranged above the license plate, or respectively the official identification, and there are larger areas in the context with a uniform coloring, i.e., the paint of the vehicle, this paint may thereby also be very precisely and quickly recognized. In particular, a comparison of the recognized coloring in the third search field with the colorings in at least the first search field and/or at least the second search field is therefore carried out. Such a comparison at least substantially allows false detections to be avoided.

In some embodiments, it may be provided that the vehicle has at least one radar sensor with a height measuring function. This radar sensor determines a transition, when it is detected, between a body region and a roof of the other vehicle. Depending on a position of this transition to an end of the other vehicle, for example a front or a rear, it is recognized whether the other vehicle is parked oriented forward or backward in the second perpendicular parking space. Since the hood is longer than a luggage compartment region in many vehicles, by using this distance between an end of the other vehicle and the transition to the roof, whether the vehicle was detected in a front region or in a rear region may also be recognized by this information. Accordingly depending thereupon, the orientation of this other vehicle in the second perpendicular parking space may also be recognized.

It is noted that a wide variety of combinations of the above-explained embodiments are also possible. In particular, the image evaluation may also be performed by itself. In addition or instead, the evaluation may be done with the radar sensor.

Another exemplary aspect relates to an electronic park assistance system for a vehicle for parking the vehicle in a perpendicular parking space. The park assistance system has at least one detection unit and at least one evaluation unit, or respectively control unit. The park assistance system is designed to perform a method according to the aforementioned aspect or any embodiment thereof. In particular, the method is performed with the park assistance system.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
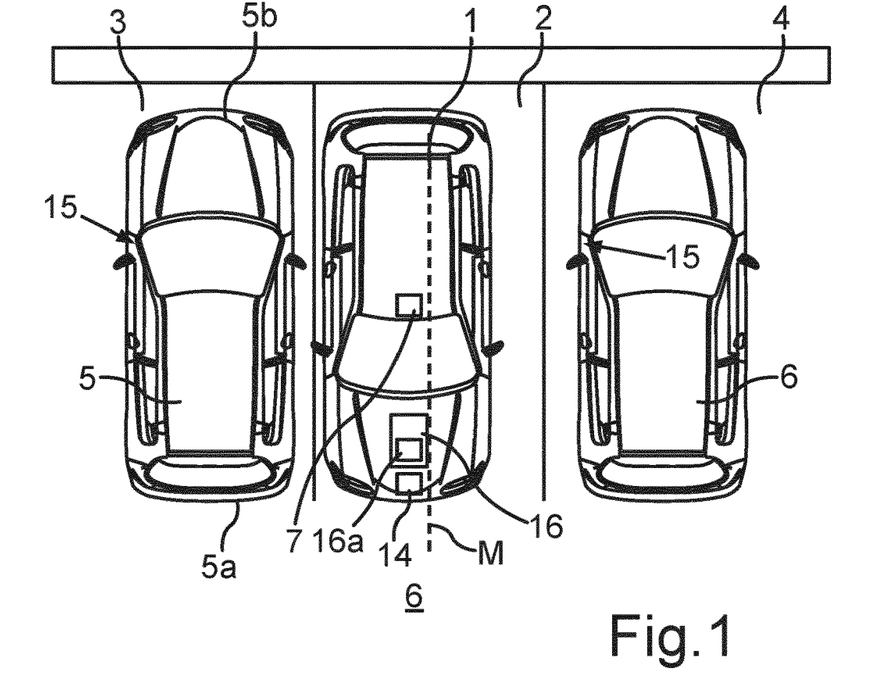
FIG. 1 shows an exemplary simplified plan view of a first parking situation.

FIG. 1 shows a plan view of a parking scenario in which a vehicle 1 is already parked in a specific target position, and/or a specific target orientation in the perpendicular parking space 2. A first additional perpendicular parking space 3 is formed adjacent to this perpendicular parking space 2, and a second further perpendicular parking space 4 is formed opposite. Another vehicle 5 is parked in the first additional perpendicular parking space 3. The other vehicle 5 is parked forward in this case. This means that a rear 5a is facing a lane 6 that opens to the perpendicular parking spaces 2, 3, 4. A front 5b of the other vehicle 5 is facing away from this lane 6.

In the scenario shown in FIG. 1, another vehicle 6 is parked in the second additional perpendicular parking space 4. This other vehicle 6 is also parked forward in this second additional perpendicular parking space 4.

With regard to exiting, in particular by a driver, the vehicle 1 has been parked backward in the perpendicular parking space 2 in the shown exemplary embodiment. Moreover, the vehicle 1 has been positioned eccentrically relative to a central longitudinal axis M of the perpendicular parking space 2. In particular, this vehicle 1 in this eccentric position is positioned closer to the additional perpendicular parking space 3 that faces a passenger door of the vehicle 1. This makes it possible for at least one driver to find a larger exit region in his perpendicular parking space 2 through the drivers door of the vehicle 1.

In this configuration, the vehicle 1 was parked in reverse orientation to the additional previously parked vehicles 5 and 6. Moreover this orientation makes it possible to provide all three drivers of the vehicles 1, 5 and 6 with the greatest possible entrance region through the particular drivers door. The vehicle 1 was parked in the first perpendicular parking space 2 at a time at which the other vehicles 5 and/or 6 were already parked in the other two perpendicular parking spaces 3, 4.

Figure 2:
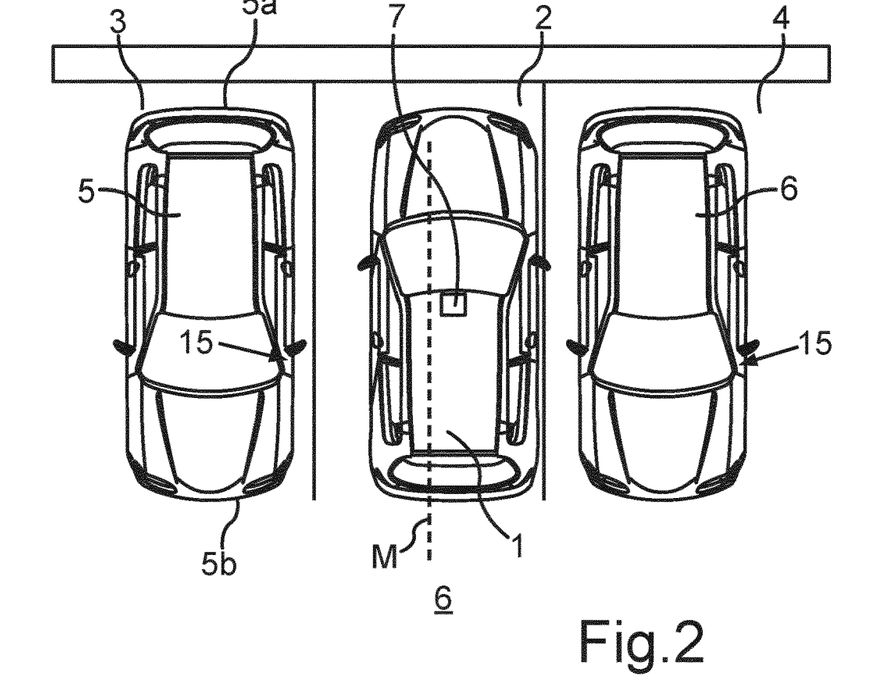
FIG. 2 shows an exemplary simplified plan view of a second parking situation.

The same holds true for the parking scenario according to FIG. 2. This simplified plan view also shows a configuration in which, in contrast to FIG. 1, the two other vehicles 5 and 6 are each parked backward in the additional perpendicular parking spaces 3 and 4. In this configuration, it is beneficial if the vehicle 1 to be parked afterwards in this respect would park forward in the perpendicular parking space 2 and would also be parked therein eccentrically relative to the center longitudinal axis M. In particular in this configuration, it is beneficial when the vehicle 1 is positioned with its passenger door facing closer to the additional perpendicular parking space 4. In this case as well, this enables a greatest possible exit region through the drivers door of the vehicle 1. Likewise, a greatest possible entrance region for the driver of vehicles 1 and 5 through the respective drivers doors is enabled. The same then holds true for an entrance for a driver through the drivers door of the vehicle 6.

Figure 3:
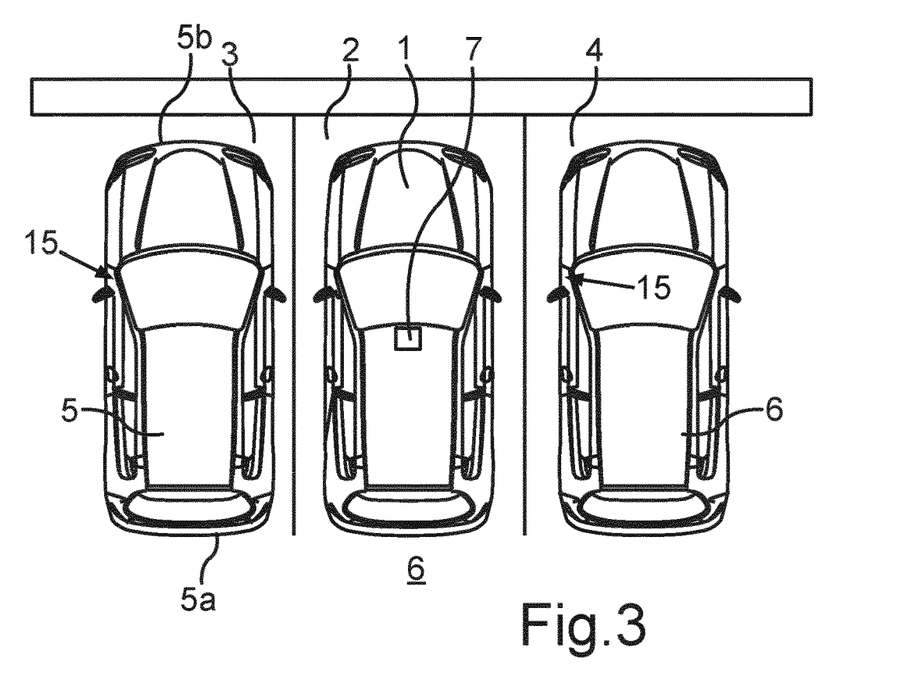
FIG. 3 shows an exemplary simplified plan view of a third parking situation.
Figure 4:
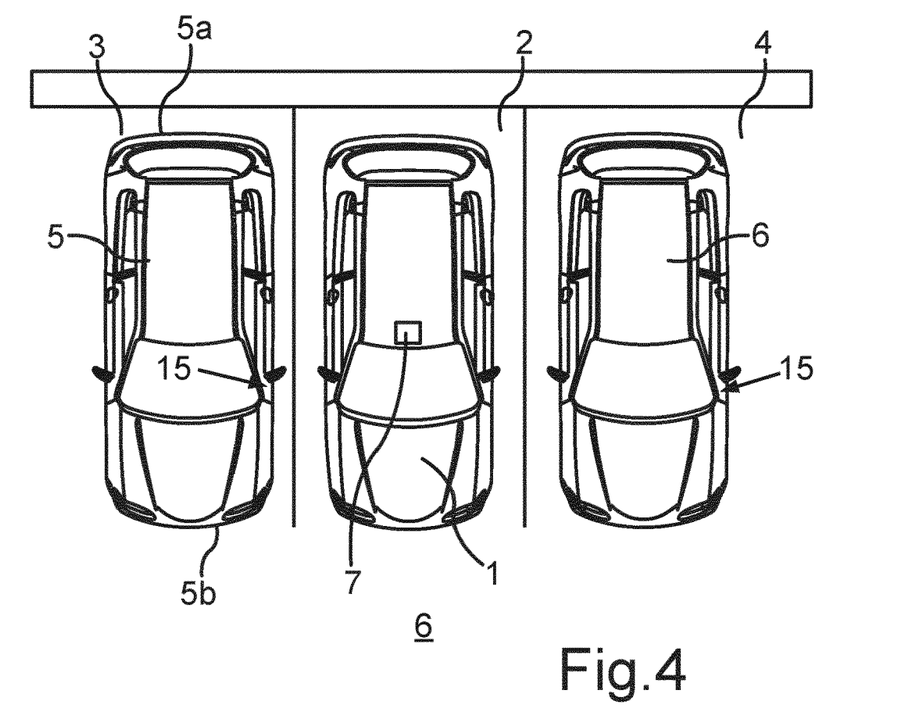
FIG. 4 shows an exemplary simplified plan view of a fourth parking situation.

If for example, due to regulations, only one particular orientation is permitted in a perpendicular parking space, i.e., for example only forward as shown in FIG. 3, or only backward as shown in FIG. 4, a best possible position for the vehicle 1 to be parked may also be determined in this respect depending on the position and/or the orientation of the adjacently parked vehicles 5 and 6. In particular, it may be provided in these parking scenarios according to FIG. 3 and FIG. 4 that the vehicle 1 is parked in the middle in the perpendicular parking space 2 and assumes the same orientation as the adjacent other vehicles 5 and 6.

To determine an orientation of another adjacently parked vehicle 5 and/or 6, it is generally provided in all exemplary embodiments that the environment is detected with a detection unit, in particular an optical detection unit 7. This at least one optical detection unit 7 is in particular a camera. By means of this at least one optical detection unit 7 of the vehicle 1, at least one image 17, in particular several images, of the at least one other already parked vehicle 5, 6 is generated before parking the vehicle 1 in the perpendicular parking space 2. The image 17 is evaluated as to whether a headlight or a taillight of this other vehicle 5 and/or 6 is recognized in this image 17. It is recognized that the other vehicle 5, 6 is parked oriented forward in the other perpendicular parking space 3 and/or 4 when at least one taillight is included in the image 17. It is recognized that the other vehicle 5, and/or 6 is parked oriented backward in the other perpendicular parking space 3, 4 when at least one headlight is included in the image 17.

In some embodiments, the coloring of a light source in the image 17 is analyzed for this purpose, and a front headlight of the other vehicle is recognized when a white light source is recognized. A taillight is recognized when a red light source is recognized. In particular, the image 17 is evaluated as to whether an equivalent light source is recognized in the width direction of the other vehicle 5, 6 at opposite end regions, or respectively side regions, of this other vehicle 5, 6, wherein the regions of the other vehicle 5, 6 are then thereby recognized that may be the headlights or taillights.

Figure 5:
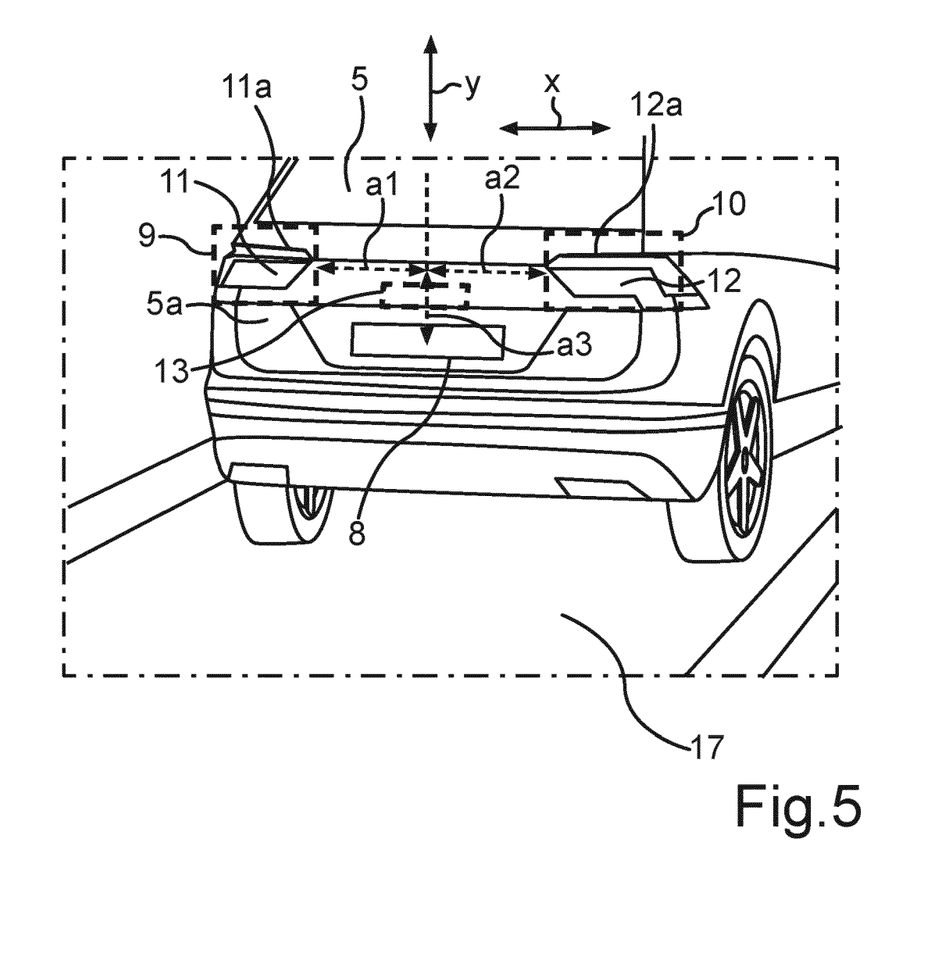
FIG. 5 shows an exemplary perspective representation for determining an orientation of another vehicle that is parked in a parking space adjacent to the parking space in which a vehicle is to be parked.

In some embodiments, it is provided that an official identification is searched for in the at least one image 17 detected by the optical detection unit 7. For example, the scenario is shown in FIG. 5 in which the forward parked other vehicle 5 is detected by the optical detection unit 7 of the vehicle 1 when driving on the lane 6. In some embodiments, this image 17 is first evaluated as to whether an official identification 8 of this other vehicle 5 is included. In the shown exemplary embodiment according to FIG. 5, an official identification 8 of this other vehicle 5 is recognized in this respect. In particular depending on this official identification 8, a headlight or a taillight of this other vehicle 5 is searched for in the image 17. In particular depending on the position of this official identification 8, a headlight or a taillight of the other vehicle 5 is searched for in this image 17. It is in particular provided that new search fields 9 and 10 are generated in the image 18 when the official identification 8 is recognized in the image 17 based on this position of the official identification 8. In particular, these two search fields 9 and 10 are formed locally defined in the width direction x of this other vehicle 5 at a specific distance a1 and a2 to the position of the official identification 8. The two search fields 9 and 10 have a smaller area, in particular significantly smaller, than the entire image 17. In addition or instead of this, when the official identification 8 is recognized in the image 17 based on the position of this official identification 8, these two new search fields 9 and 10 in the image 17 are generated such that, in the direction of the height y of the other vehicle 5, they each have a specific second distance a3 to the position of the official identification 8. In particular, these two distances a1 and a3 correspond, wherein a2 is for example the same as a1, to those in which light sources of the other vehicle 5 are normally arranged relative to the official identification 8 on this other vehicle 5, in particular on a vehicle. The two search fields 9 and 10 are therefore locally positioned in an artful way in the image 17 such that, in comparison to the position of the official identification 8, they cover the surface areas with a great probability in which headlights or taillights are normally arranged relative to the official identification 8, including in reality. The distances a1, a2 and a3 are in particular determined with respect to certain sizes of the official identification 8 in the image 17 in comparison to reality. In this regard, other sizes of components of the other vehicle 5 may be considered in addition or instead whose real sizes are known or may easily be estimated. As a result, the real distances in the image 17 may also be represented precisely in the smaller size ratios adapted therein in relation to other sizes by the distances a1, a2 and a3.

In some embodiments, it may be provided that a color distribution is evaluated in these search fields 9 and 10. When there is a red component greater than a threshold, the taillight 11 is recognized in the search field 9. When there is a red component greater than a threshold, another taillight 12 is recognized in the search field 10.

If on the other hand a white component greater than a threshold is recognized, a headlight is recognized in the search field 9 and/or 10.

In the representation in FIG. 5 in which the forward-parked other vehicle 5 is shown, rear lights 11 and 12 are recognized in the search fields 9 and 10. This may in particular only be evaluated based on the aforementioned color distribution. In addition to or instead of this, it may be provided that the search fields 9 and 10 are set large enough so that a characteristic boundary contour 11a and/or 12a of a component of the vehicle 5 that is normally arranged on a rear 5a or a front 5b of this other vehicle 5 is recognized. In particular, the boundary contour 11a, 12a contained in the search field 9 and/or 10 is then evaluated as to whether the component in the image 17 is a light source. In particular, it is evaluated whether it is then a headlight or a taillight.

In some embodiments, it may be provided that, depending on the position of the official identification 8, at least a third search field 13 is generated in the image 17. This third search field 13 is generated in particular directly above the official identification 8 and is arranged locally defined in the image 17. This third search field 13 is evaluated with respect to a coloring. Depending thereupon, the coloring of the other vehicle 5 is determined, or respectively recognized. Accordingly, the basic paint and the basic coloring of the other vehicle 5 is recognized. In particular, this information is used to be able to better perform the evaluation of the color distribution in the search fields 11 and 12. This allows false detections of a headlight and/or a taillight to be better avoided since the color distribution in the search fields 9 and 10 may then be better evaluated, in particular with respect to the coloring of the other vehicle 5.

Figure 6:
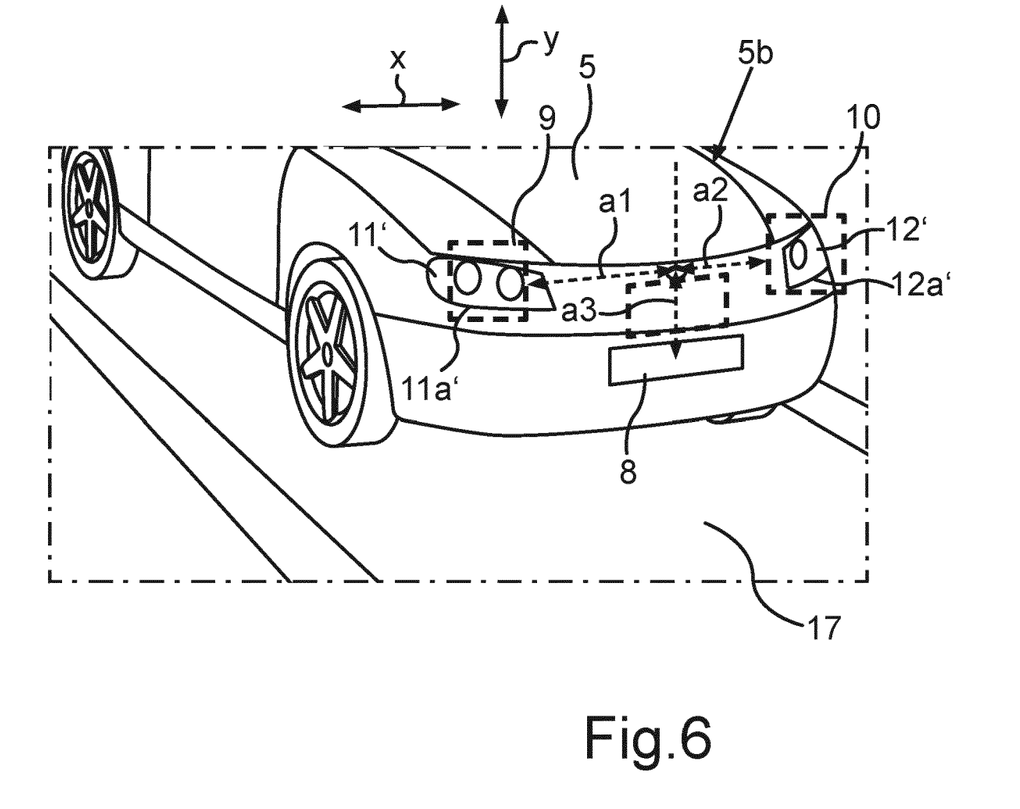
FIG. 6 shows an exemplary perspective representation for determining an orientation different from FIG. 5 of another vehicle in an adjacent perpendicular parking space.

FIG. 6 shows an image 17 in a corresponding representation as in FIG. 5, in which the other vehicle 5 is shown according to the parking scenario in FIG. 2. In this reverse-parked state of the other vehicle 5, the front 5b is detected with the optical detection unit 7. The evaluation scenario is similar to as in FIG. 5.

In FIG. 6, in contrast to FIG. 5, it is then recognized that the headlights 11', 12' are contained in the search fields 9 and 10, and that this other vehicle 5 is accordingly parked backward in this other perpendicular parking space 3. The headlights 11', 12' have boundary contours 11a' and 12a'.

In addition or instead of this, it may be provided that the vehicle 1 has at least one radar sensor 14 (FIG. 1). This radar sensor 14 is designed with a height measuring function. This radar sensor 14 may determine a transition 15 (FIG. 1) between a body region and a roof of the other vehicle 5. Depending on a position of the transition to an end, in particular a front 5b and/or a rear 5a, it is recognized whether this other vehicle 5 is parked oriented forward or backward in this other perpendicular parking space 3.

The explanations presented here with respect to the other vehicle 5 also apply entirely and accordingly to the other vehicle 6.

In particular, the vehicle 7 has a park assistance system 16. This has in particular at least one detection unit, in particular the optical detection unit 7. The park assistance system 16 for example also has at least one evaluation unit 16a. This may also be a control unit. It may have a memory. Moreover, the park assistance system 16, in particular the evaluation unit 16a, has a computer program product. This has commands that, when they are saved on a computer, in particular the evaluation unit 16a, are designed to execute the method as mentioned.

LIST OF REFERENCE NUMERALS

1 Vehicle
2 Perpendicular parking space
3 Second perpendicular parking space
4 Second perpendicular parking space
5 Other vehicle
5a Rear
5b Front
6 Other vehicle
7 Detection unit
8 Official identification
9 First search field
10 Second search field
11 Taillight
11' Headlight
11a Boundary contour
11a' Boundary contour
12 Taillight
12' Headlight
12a Boundary contour
12a' Boundary contour
13 Third search field
14 Radar sensor
15 Transition
16 Park assistance system
17 Image
a1 First distance
a2 First distance
a3 Second distance
x Width direction
y Height direction The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for parking a vehicle in a first perpendicular parking space, wherein an other vehicle is parked in at least one second perpendicular parking space that borders the first perpendicular parking space, the method comprising:
determining one or more of the position and the orientation of the other vehicle in the second perpendicular parking space and, depending thereupon;
determining one or more of a target position and a target orientation of the vehicle in the first perpendicular parking space;
using at least one optical detection unit of the vehicle, generating at least one image of the at least one other vehicle before parking the vehicle in the first perpendicular parking space; and
evaluating the image as to whether a headlight or a taillight of the other vehicle is recognized in the image, wherein it is recognized that the other vehicle is parked oriented forward in the second perpendicular parking space when at least one taillight is included in the image, and it is recognized that the other vehicle is parked oriented backward in the second perpendicular parking space when at least one headlight is included in the image; wherein
evaluating comprises searching for an official identification of the other vehicle in the image, wherein when the official identification is recognized in the image based on the position of the official identification, two new search fields in the image are generated that, in the direction of the width of the other vehicle, each have a given first distance to the position of the official identification, and/or in the direction of the height of the other vehicle, each have a given second distance to the position of the official identification, wherein the distances correspond to those in which exterior light sources are normally arranged relative to the official identification.

2. The method of claim 1, wherein the coloring of a light source in the image is analyzed, and a taillight is recognized when a red light source is recognized.

3. The method of claim 2, wherein the image is evaluated as to whether an equivalent light source is recognized in the width direction of the other vehicle at opposite end regions of the other vehicle, wherein the regions of the other vehicle are then thereby recognized that may be the headlights or taillights.

4. The method of claim 2, wherein an official identification of the other vehicle is searched for in the image, wherein when an official identification is recognized, depending on the position thereof, a headlight or a taillight of the other vehicle is searched for in this image.

5. The method of claim 2, wherein the vehicle has at least one radar sensor with a height measuring function, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space.

6. The method of claim 1, wherein the image is evaluated as to whether an equivalent light source is recognized in the width direction of the other vehicle at opposite end regions of the other vehicle, wherein the regions of the other vehicle are then thereby recognized that may be the headlights or taillights.

7. The method of claim 6, wherein an official identification of the other vehicle is searched for in the image, wherein when an official identification is recognized, depending on the position thereof, a headlight or a taillight of the other vehicle is searched for in this image.

8. The method of claim 6, wherein the vehicle has at least one radar sensor with a height measuring function, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space.

9. The method of claim 1, wherein a color distribution is evaluated in these search fields, wherein a taillight is recognized when there is a red component greater than a threshold.

10. The method of claim 9, wherein the search fields are set to be large enough for a boundary contour of a component of the other vehicle that is normally arranged on the outside on a rear or a front of the other vehicle is detected in the image when the rear or the front is detected, wherein the boundary contour is evaluated as to whether the component in the image is a light source.

11. The method of claim 9, wherein depending on the position of the official identification, at least a third search field is generated in the image, wherein the third search field is evaluated with respect to its coloring, and depending thereupon, the coloring of the other vehicle is determined.

12. The method of claim 1, wherein the search fields are set to be large enough for a boundary contour of a component of the other vehicle that is normally arranged on the outside on a rear or a front of the other vehicle is detected in the image when the rear or the front is detected, wherein the boundary contour is evaluated as to whether the component in the image is a light source.

13. The method of claim 12, wherein depending on the position of the official identification, at least a third search field is generated in the image, wherein the third search field is evaluated with respect to its coloring, and depending thereupon, the coloring of the other vehicle is determined.

14. The method of claim 1, wherein depending on the position of the official identification, at least a third search field is generated in the image, wherein the third search field is evaluated with respect to its coloring, and depending thereupon, the coloring of the other vehicle is determined.

15. The method of claim 1, wherein the vehicle has at least one radar sensor with a height measuring function, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space.

16. The method of claim 1, wherein the vehicle has at least one radar sensor with a height measuring function, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space.

17. The method of claim 1, wherein the vehicle has at least one radar sensor with a height measuring function, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space.

18. A park assistance system for a vehicle for parking in a perpendicular parking space, wherein the park assistance system is configured for:
  determining one or more of the position and the orientation of the other vehicle in the second perpendicular parking space and, depending thereupon;
  determining one or more of a target position and a target orientation of the vehicle in the first perpendicular parking space;
  using at least one optical detector of the vehicle, generating at least one image of the at least one other vehicle before parking the vehicle in the first perpendicular parking space; and
  evaluating the image as to whether a headlight or a taillight of the other vehicle is recognized in the image, wherein it is recognized that the other vehicle is parked oriented forward in the second perpendicular parking space when at least one taillight is included in the image, and it is recognized that the other vehicle is parked oriented backward in the second perpendicular parking space when at least one headlight is included in the image; wherein
  evaluating comprises searching for an official identification of the other vehicle in the image, wherein when the official identification is recognized in the image based on the position of the official identification, two new search fields in the image are generated that, in the direction of the width of the other vehicle, each have a specific first distance to the position of the official identification, and/or in the direction of the height of the other vehicle, each have a specific second distance to the position of the official identification, wherein the distances correspond to those in which exterior light sources are normally arranged relative to the official identification.

19. A method for parking a vehicle in a first perpendicular parking space, wherein an other vehicle is parked in at least one second perpendicular parking space that borders the first perpendicular parking space, the method comprising:
- determining one or more of the position and the orientation of the other vehicle in the second perpendicular parking space;
- determining, whether the other vehicle is parked oriented forward in the second perpendicular parking space or is parked oriented backward in the second perpendicular parking space using at least one radar sensor with a height measuring function of the vehicle, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space;
- providing information indicative of whether the other vehicle is parked oriented forward or backward in the second perpendicular parking space to a park assist system of the vehicle; and
- parking of the vehicle by the park assist system using the information.

20. A park assistance system for a vehicle for parking in a perpendicular parking space, wherein the park assistance system is configured for:
- determining one or more of the position and the orientation of the other vehicle in the second perpendicular parking space;
- determining, whether the other vehicle is parked oriented forward in the second perpendicular parking space or is parked oriented backward in the second perpendicular parking space using at least one radar sensor with a height measuring function of the vehicle, wherein with the radar sensor, a transition between a body region and a roof of the other vehicle is determined, wherein depending on a position of this transition to an end of the other vehicle, it is recognized whether the other vehicle is parked oriented forward or backward in the second perpendicular parking space; and
- parking of the vehicle by the park assist system based on the recognition of whether the other vehicle is parked oriented forward or backward in the second perpendicular parking space.

* * * * *